C. B. PERKINS.
HORSE-RAKE.
No. 171,419.  Patented Dec. 21, 1875.
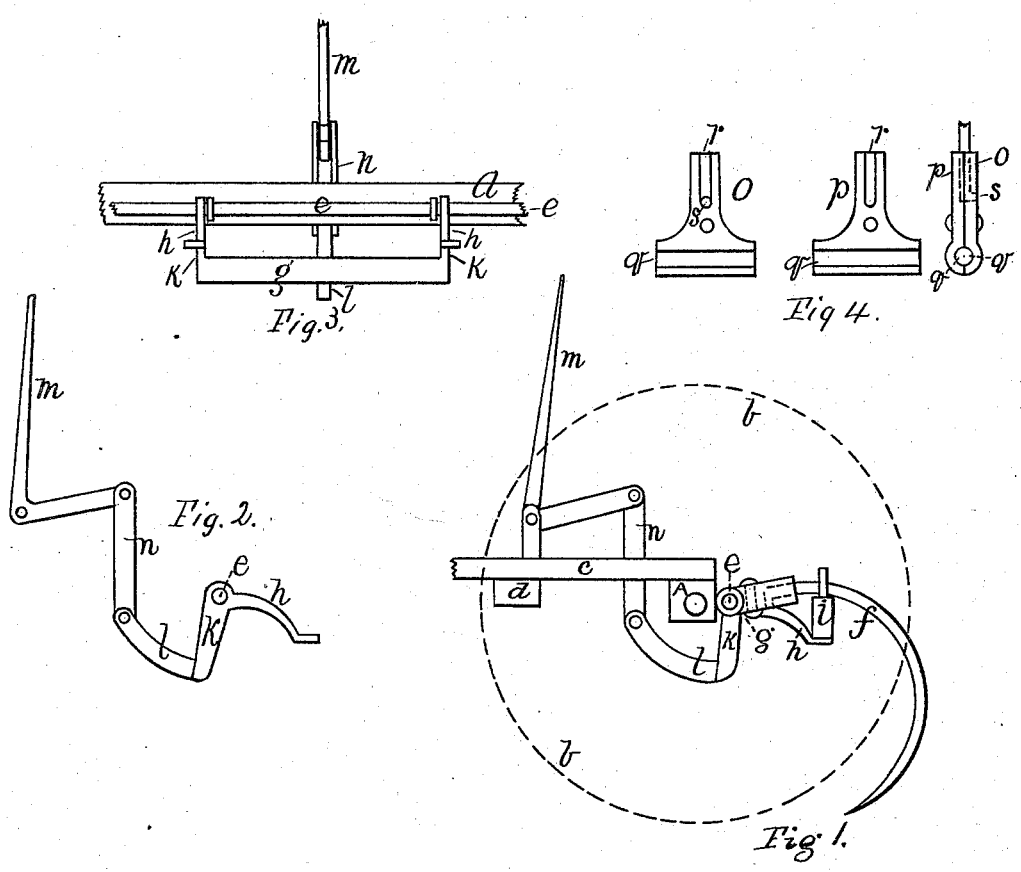

UNITED STATES PATENT OFFICE.

CHARLES B. PERKINS, OF KENDUSKEAG, MAINE, ASSIGNOR TO HIMSELF AND WILLIAM HIGGINS, OF SAME PLACE.

IMPROVEMENT IN HORSE-RAKES.

Specification forming part of Letters Patent No. 171,419, dated December 21, 1875; application filed October 4, 1875.

*To all whom it may concern:*

Be it known that I, CHARLES B. PERKINS, of Kenduskeag, in the county of Penobscot and State of Maine, have invented certain new and useful Improvements in Horse-Rakes; and I do hereby declare that the following is a full, clear, and exact description thereof, that will enable others skilled in the art to which it appertains to make and use the same, reference being had to accompanying drawings, forming a part of this specification, in which—

Figure 1 shows a side view of my rake with the wheel in dotted lines; Fig. 2, a side view of levers; Fig. 3, a rear view of same; Fig. 4, a view of clasp or jaw with details.

Same letters show like parts.

My invention relates to certain improvements in horse-rakes, consisting of an improvement in attaching the teeth to the rake, whereby they are unaffected by the elevation or depression of the shafts from any cause; in an improved arrangement of levers for raising the teeth; and in an improved clasp or jaw for securing them.

Reference to the drawing will illustrate my invention fully.

A shows the axle of the horse-rake, mounted on wheels $b$, as usual, and supporting a frame, consisting of side pieces $c\ c$ and cross-bar $d$, to which the shafts are attached. Close to the back part of the axle is secured a rod, $e$, extending its whole length, and upon this rod the teeth $f$ are hinged. The effect is to bring the point of connection of the teeth of the rake so close to the center upon which the axle turns that they are affected very slightly by the motion of the axle around its center, caused by difference in inclination or elevation of the shafts from inequalities of the ground or other reason.

My improved arrangement of levers for raising the teeth from the ground is shown in Figs. 2 and 3. Hinged to the rod $e$, at the rear of the axle A, is a forked lever, $g$, having arms $h\ h$, extending outward, and secured to the lifting-bar $i$, supporting the teeth $j$ and arms $k\ k$ and $l$, extending downward and backward, respectively. This forked lever enables the power to be applied to the bar $i$ at points some distance apart, and obviates any danger of tipping. The manner of its application, having its fulcrum upon the rod on which the teeth are hinged, enables it to raise them with ease and rapidity. To operate this forked lever, I employ a bell-crank, hinged to the cross-bar $d$, one end of which, $m$, serves as a handle by which it may be operated, while the other is attached to a connecting-rod, $n$, which is secured to the arm $l$ of the forked lever. By pressing back the handle $m$ of the bell-crank lever the connecting-rod $n$ is forced down, throwing up the arms $h\ h$ of the forked lever $g$, and elevating the teeth with much more rapidity and ease than by the usual means.

My clasp or jaw for securing the teeth is shown in Fig. 4 and details. It is formed in two parts, $o\ p$, sufficiently wide at the base or where attached to the rod $e$ to keep the teeth the proper distance apart on the rod. Both parts are provided with a semicircular groove, $q$, to receive the rod $e$, and also a second groove, $r$, at right angles to the groove $q$, to receive the tooth. This groove $r$ is terminated by a cavity, $s$. The tooth to be inserted is bent over at the end, and the bent portion placed in the cavity. The two parts $o$ and $p$ are then placed together and over the rod $e$, and the parts are then secured by a bolt or rivet passing through them, holding the tooth securely in place, and at the same time allowing it to be readily detached or replaced.

What I claim as my invention, and desire to secure by Letters Patent, is—

1. The combination of the lifting-bar $i$, and forked lever $g$, having arms $h\ h$, $k\ k$, and $l$, and hinged to the rod $e$, upon which the teeth are pivoted, as set forth, for the purposes specified.

2. The combination of the forked lever $g$, constructed as described, with the bell-crank lever $m$, and connecting-rod $n$, as and for the purposes set forth.

3. The improved clasp or jaw for securing the teeth, consisting of two parts, $o\ p$, provided with grooves $q\ r$ and cavity $s$, and united and held in place by a bolt or screw, as herein specified.

4. The improved horse-rake, constructed and arranged as herein specified, having its teeth hinged to a rod, *e*, directly behind the axle A, and operated by a forked lever, *g*, also hinged to said rod by means of a bell-crank, *m*, and connecting-rod *n*, substantially as and for the purposes described.

In testimony that I claim the foregoing I have hereunto set my hand this 28th day of September, 1875.

CHARLES B. PERKINS.

Witnesses:
  F. A. H. STACKPOLE,
  FREMONT HORNE.